US012716750B2

(12) United States Patent
Kim

(10) Patent No.: US 12,716,750 B2
(45) Date of Patent: Aug. 25, 2026

(54) METHOD FOR DOWNLOADING LATEST MAP AND A SYSTEM THEREOF

(71) Applicant: HYUNDAI AUTOEVER CORP., Seoul (KR)

(72) Inventor: Jong Gon Kim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 15 days.

(21) Appl. No.: 18/953,527

(22) Filed: Nov. 20, 2024

(65) Prior Publication Data

US 2025/0164279 A1 May 22, 2025

(30) Foreign Application Priority Data

Nov. 22, 2023 (KR) ........................ 10-2023-0163127

(51) Int. Cl.
*G01C 21/00* (2006.01)

(52) U.S. Cl.
CPC ................................ *G01C 21/3889* (2020.08)

(58) Field of Classification Search
CPC ............ G01C 21/3889; G01C 21/3815; G01C 21/3896; G01C 21/3859; G01C 21/387
USPC ........................................................ 701/420
See application file for complete search history.

(56) References Cited

U.S. PATENT DOCUMENTS 11,105,638 B2 8/2021 Jin
2014/0025289 A1* 1/2014 Schunder ............... G01C 21/34 701/461
2015/0173022 A1* 6/2015 Black .................... H04W 4/029 455/456.3
2016/0313138 A1* 10/2016 Chupakhin ........ G01C 21/3667
2018/0352374 A1* 12/2018 Ball .................... G06F 16/9537
2019/0204094 A1 7/2019 Jin
2019/0293445 A1 9/2019 Cho
2023/0043557 A1* 2/2023 Golding ................. G01C 21/36
2024/0102821 A1* 3/2024 Vallet ................ G01C 21/3896

FOREIGN PATENT DOCUMENTS

JP 2008020263 A * 1/2008
JP 2015042957 A * 3/2015
KR 102273559 B1 7/2021
KR 102338270 B1 12/2021
KR 102568113 B1 8/2023

* cited by examiner

*Primary Examiner* — Hunter B Lonsberry
*Assistant Examiner* — Helen Li
(74) *Attorney, Agent, or Firm* — Lempia Summerfield Katz LLC

(57) ABSTRACT

A method for downloading latest map data includes classifying a route traveled without route setting based on a starting point and a destination of the route. The method also includes counting a number of trips for the route and performing a download of the latest map data for the route based on the number of trips.

4 Claims, 11 Drawing Sheets

METHOD FOR DOWNLOADING LATEST MAP AND A SYSTEM THEREOF

CROSS-REFERENCE TO RELATED APPLICATION

This application claims the benefit of and priority to Korean Patent Application No. 10-2023-0163127, filed on Nov. 22, 2023, the entire contents of which are hereby incorporated herein by reference.

TECHNICAL FIELD

The present disclosure relates to a method for downloading latest map and a system thereof.

BACKGROUND

In a navigation system, there are two methods for downloading map data: an offline download method and an online download method. When downloading map data using the offline download method, there is the inconvenience of users having to manually download and install the files, and there may be instances where road information and traffic conditions are missed due to long download cycles.

Conversely, when downloading map data through the online download method, users do not need to manually download the map data, alleviating user inconvenience. Moreover, since the map data can be downloaded in real-time, more accurate road and traffic information can be received.

However, the online download method may cause issues with excessive communication fees due to the increased data usage from downloading the map data in real-time from the server.

The discussions in this Background section are intended merely to provide background information and do not constitute an admission of prior art.

SUMMARY

Aspects of the present disclosure provide a method for selectively downloading the latest map data and a system for performing the method.

Aspects of the present disclosure also provide a method for downloading the latest map data and a system for performing the method that do not cause inconvenience to a navigation user even when the download of the latest map data is omitted.

Aspects of the present disclosure also provide a method for downloading the latest map data and a system for performing the method that specify driving routes for which omitting the download of the latest map data does not cause issues, thereby saving communication fees.

However, aspects of the present disclosure are not limited to those set forth herein. The above and other aspects of the present disclosure should become more apparent to one of ordinary skill in the art to which the present disclosure pertains by referencing the detailed description of the present disclosure below.

According to an aspect of the present disclosure, a method for downloading latest map data is provided. The method may be performed by a navigation device. The method includes classifying a route traveled without route setting based on its starting point and destination. The method also includes counting a number of trips for the classified route and performing a download of the latest map data for the route based on the counted number of trips.

In some embodiments, classifying the route traveled without route setting includes classifying the route traveled without route setting based on similarities of starting points and destinations. There may be multiple routes traveled without route setting.

In some embodiments, performing the download of the latest map data for the route may include omitting the download of the latest map data for the route when the counted number of trips is greater than or equal to a first threshold, and performing the download of the latest map data for the route when the counted number of trips is less than the first threshold.

In some embodiments, omitting the download of the latest map data for the route may include displaying information regarding whether to perform the download of the latest map data for the route, and omitting the download of the latest map data for the route based on user input for the displayed information regarding whether to perform the download.

According to another aspect of the present disclosure, a method for downloading latest map data is provided. The method may be performed by a navigation device. The method includes counting a number of deviations from a predicted driving route and performing a download of the latest map data for the route based on the counted number of deviations.

In some embodiments, the predicted driving route may include routes that are the same from their starting point to their destination.

In some embodiments, performing the download of the latest map data may include omitting the download of the latest map data for the route when the counted number of deviations is greater than or equal to a first threshold, and performing the download of the latest map data for the route when the counted number of deviations is less than the first threshold.

In some embodiments, omitting the download of the latest map data for the route may include displaying information regarding whether to perform the download of the latest map data for the route, and omitting the download of the latest map data for the route based on user input for the displayed information.

According to yet another aspect of the present disclosure, yet a method for downloading latest map data is provided. The method may be performed by a navigation device. The method may include counting a number of power-offs during a trip along a predicted driving route, and performing a download of the latest map data for the route based on the counted number of power-offs.

In some embodiments, the predicted driving route may include routes that are the same from their starting point to their destination.

In some embodiments, performing the download of the latest map data may include omitting the download of the latest map data for the route when the counted number of power-offs is greater than or equal to a first threshold, and performing the download of the latest map data for the route when the counted number of power-offs is less than the first threshold.

In some embodiments, omitting the download of the latest map data for the route may include displaying information regarding whether to perform the download of the latest map data for the route, and omitting the download of the latest map data for the route based on user input for the displayed information.

It should be noted that the effects of the present disclosure are not limited to those described above, and other effects of the present disclosure should be apparent from the following description.

BRIEF DESCRIPTION OF THE DRAWINGS

The above and other aspects and features of the present disclosure should become more apparent from the following description with reference to the accompanying drawings, in which.

DETAILED DESCRIPTION

Figure 1:
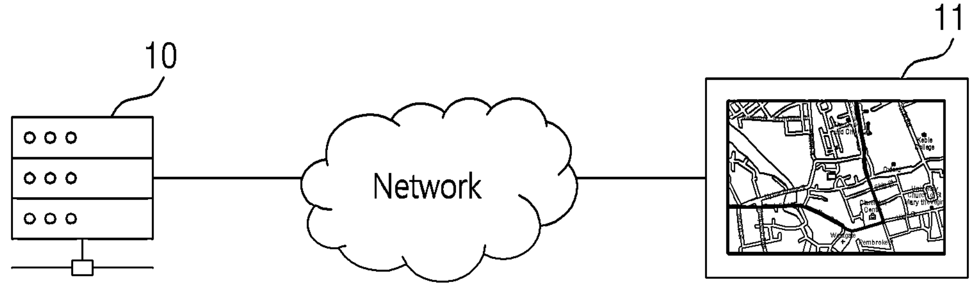
FIG. 1 is a configuration diagram of a system for downloading latest map data according to an embodiment of the present disclosure.

Hereinafter, embodiments of the present disclosure are described in detail with reference to the accompanying drawings. Advantages and features of the present disclosure and methods of accomplishing the same should be more clearly understood by those having ordinary skill in the art to which the present disclosure pertains by reference to the following detailed description of embodiments and the accompanying drawings. The present disclosure may, however, be embodied in many different forms and should not be construed as being limited to the embodiments set forth herein. Rather, these embodiments are provided to make the present disclosure thorough and complete and to fully convey the concept of the disclosure to those having ordinary skill in the art. The scope of the present disclosure should only be defined by the appended claims and equivalents thereof.

In adding reference numerals to the components of each drawing, it should be noted that the same reference numerals are assigned to the same components as much as possible even though the components are shown in different drawings. In addition, in describing the present disclosure, when it was determined that a detailed description of the related well-known configuration or function may obscure the gist of the present disclosure, the detailed description thereof has been omitted.

Unless otherwise defined, all terms used in the present specification (including technical and scientific terms) may be used in a sense that can be commonly understood by those having ordinary skill in the art. In addition, the terms defined in the commonly used dictionaries should not be ideally or excessively interpreted unless the terms are specifically defined clearly in the present disclosure. The terminology used herein is for the purpose of describing particular embodiments only and is not intended to be limiting of the disclosure. In the present disclosure, the singular also includes the plural unless specifically stated otherwise in the present disclosure.

In addition, in describing the component of the present disclosure, terms, such as first, second, A, B, (a), (b), can be used. These terms are only for distinguishing the components from other components, and the nature or order of the components is not limited by the terms. When a component is described as being "connected," "coupled" or "contacted" to another component, that component may be directly connected to or contacted with that other component, but it should be understood that one or more intermediate components may be "connected," "coupled" or "contacted" between the component and the other component.

When a component, device, module, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to the accompanying drawings.

FIG. 1 is a configuration diagram of a system for downloading the latest map data according to an embodiment of the present disclosure.

As illustrated in FIG. 1, the system for downloading the latest map data may include a service server 10 and a navigation device 11. The navigation device 11 may be provided in a vehicle and may receive latest map data information and predicted driving route information from the service server 10.

The navigation device 11 may store the latest map data information and predicted driving route information received from the service server 10 in a local storage provided within the navigation device 11.

According to some embodiments of the present disclosure, the navigation device 11 may selectively receive the latest map data information from the service server 10. For example, the navigation device 11 may omit the reception of the latest map data information from the service server 10 for routes frequently traveled by a user. In this case, the unnecessary reception of the latest map data can be prevented, thereby saving data communication fees.

In embodiments, routes frequently traveled by the user may include routes that are frequently traveled without destination setting, routes where which the user deviates at the same points each time after setting a destination, and routes that are pre-terminated at the same points each time after setting a destination.

In some embodiments, the routes frequently traveled by the user may also include routes to points arbitrarily registered by a navigation service user (e.g., registered points, homes, offices, etc.) and routes to frequently visited places based on personal information from a mobile device (e.g., credit card transaction data, information on the frequently visited places, etc.).

However, the present disclosure is not so limited. Generally, all routes frequently traveled by the user may be considered targets for the selective reception of the latest map data information. Specific examples of such routes are described in more detail below.

Figure 2:
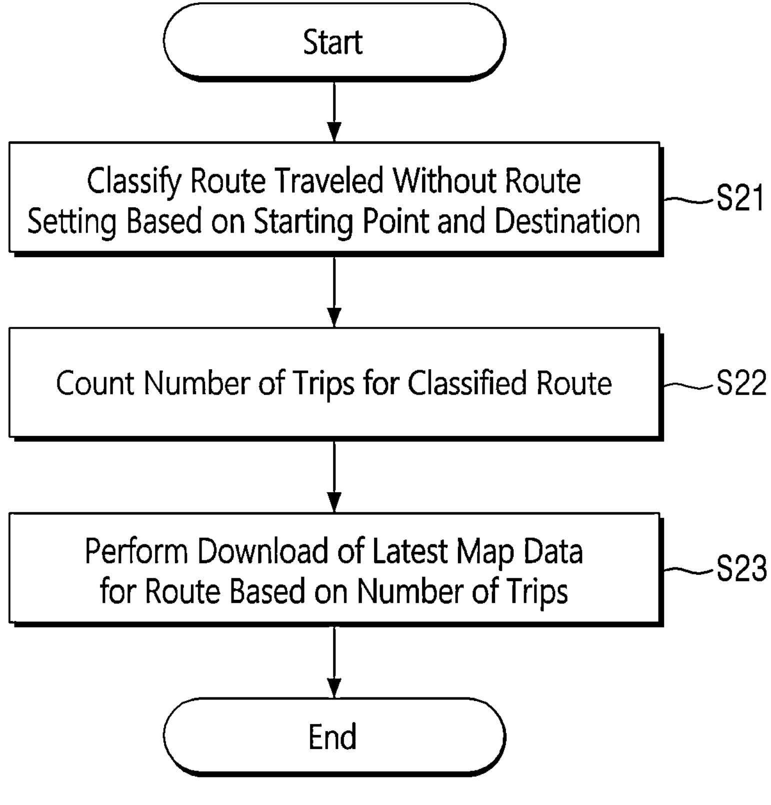
FIG. 2 is a flowchart illustrating a method for downloading latest map data based on the number of trips of each route traveled without route setting, according to an embodiment of the present disclosure.

FIG. 2 is a flowchart illustrating a method for downloading latest map data based on the number of trips of each route traveled without route setting, according to an embodiment of the present disclosure.

Referring to FIG. 2, in a step or operation S21, a navigation device may classify a route driven by a vehicle without route setting based on its starting point and destination. The route traveled without route setting may refer to each route driven by the vehicle without receiving a predicted driving route from the navigation device. There may exist multiple routes traveled without route setting.

In an embodiment, the navigation device may classify the route traveled without route setting based on the similarities of starting points and destinations. For example, even if the starting points of multiple routes traveled without route setting are all the same, the number of trips may not be counted if their destinations are all different.

Conversely, even if the destinations of the multiple routes are the same, the number of trips may not be counted if their starting points are all different.

However, if the starting points and destinations of the multiple routes are the same, then the number of trips may be counted. In this case, the classification criteria for determining the similarities of starting points and destinations may slightly differ, but if both the starting points and destinations are within a specific distance (e.g., within 10 meters or within 20 meters), the classification criteria for similarities of starting points and destinations may be satisfied.

In a step or operation S22, the navigation device may count the number of trips for a classified route. Here, the classified route may refer to each route traveled without route setting that is classified in the step or operation S21 as meeting the classification criteria for the similarities of starting points and destinations.

In a step or operation S22, the count for the number of trips may be incremented by +1 for each trip, but if the classification criteria for the similarities of starting points and destinations are almost identical, the count for the number of trips may be incremented by +2 or +3 for each trip, with a weight value applied.

For example, if the distance between the starting points of the multiple routes traveled without route setting are within 1 meter and the distance between the destinations of the corresponding routes is also within 1 meter, it may be determined that the multiple routes are almost identical, beyond simply meeting specific distance criteria. In this case, the number of trips may be increased by +2, with a weight value applied.

In a step or operation S23, the navigation device may perform the download of the latest map data based on the number of trips. Here, the number of trips may refer to the counted number of trips from the step or operation S22 for the classified route based on the similarities of starting points and destinations.

Furthermore, the target for the download of the latest map data may be the classified route traveled without route setting from the step or operation S21. The method of FIG. 2, according to some embodiments, is described in more detail below with reference to FIG. 3.

Figure 3:
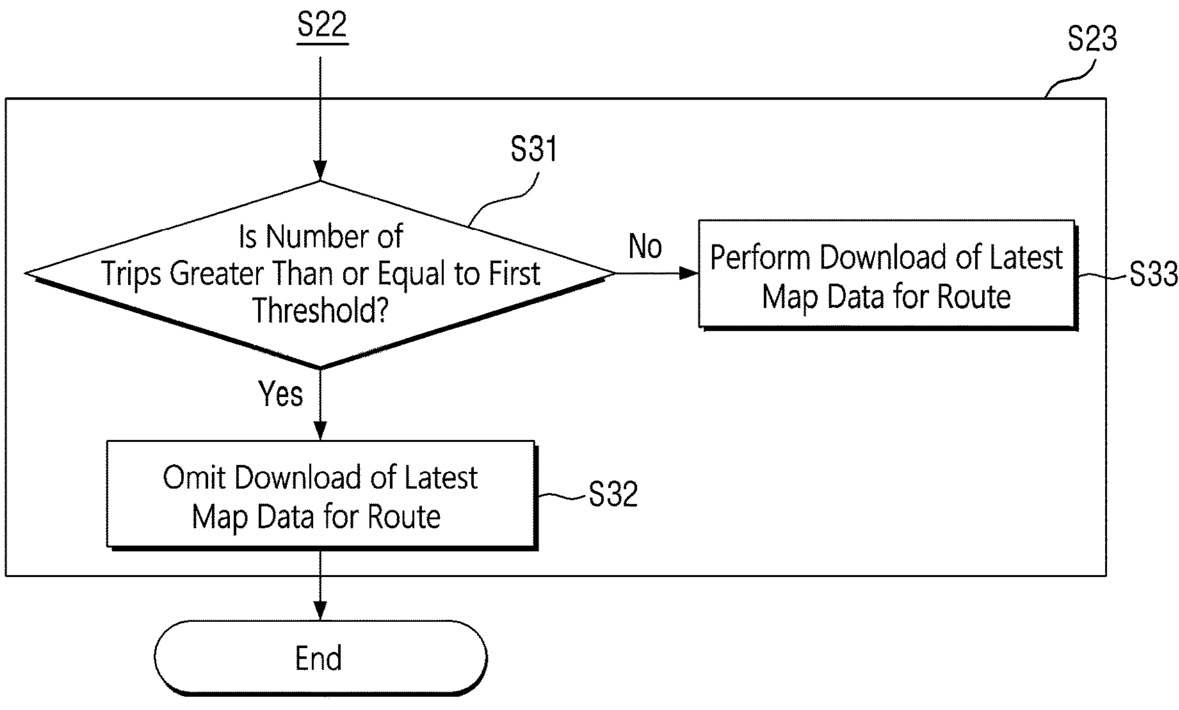
FIG. 3 is a detailed flowchart illustrating step or operation S23 of FIG. 2 where the download of the latest map data is performed based on the number of trips, according to an embodiment of the present disclosure.

FIG. 3 is a detailed flowchart illustrating the step or operation S23 of FIG. 2 where the download of the latest map data is performed based on the number of trips, according to an embodiment of the present disclosure.

Referring to FIG. 3, in a step or operation S31, the navigation device may determine whether the number of trips counted in the step S22 or operation of FIG. 2 exceeds a first threshold. Here, the first threshold may be set by the user and is not limited to a specific value, as long as it corresponds to the number of trips used to determine a frequently traveled route.

When the number of trips is determined in the step or operation S31 to be less than the first threshold, the download of the latest map data may be performed in the step or operation S33. This is because, if the number of trips is less than the first threshold, the corresponding route may be considered not frequently traveled by the user, and the download of the latest map data may be performed.

However, when the number of trips is determined in the step or operation S32 to be equal to or greater than the first threshold, the route may be considered frequently traveled by the user, and the download of the latest map data may be omitted in the step or operation S33.

This is because, if the download of the latest map data is performed even for routes frequently traveled by the user, excessive communication fees may be incurred, and problems such as process overload may arise.

Therefore, to address these issues, routes for which the download of the latest map data is unnecessary may be classified, and the download of the latest map data may be omitted for routes that pass the classification criteria.

Figure 4:
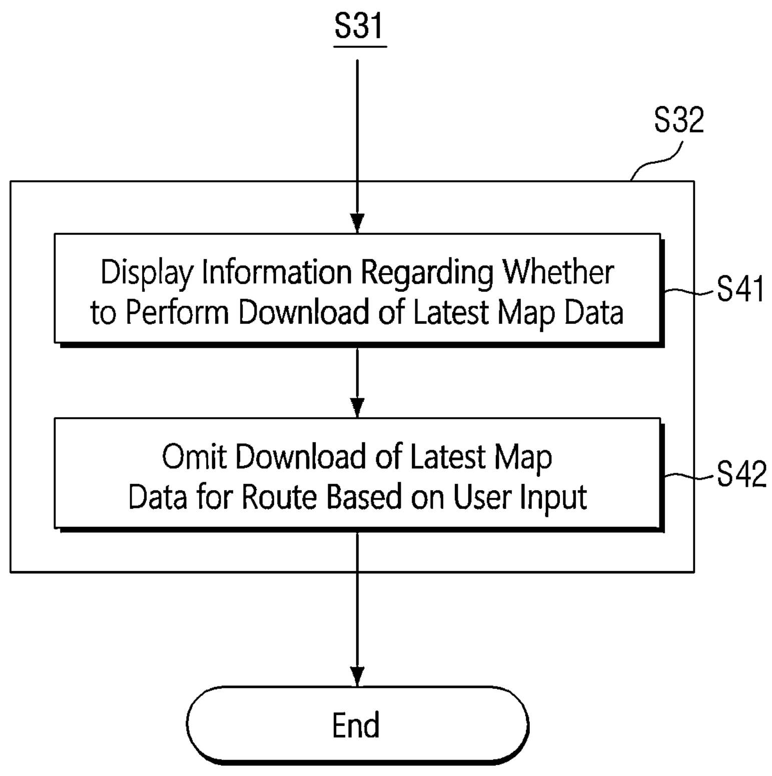
FIG. 4 is a detailed flowchart illustrating step or operation S32 of FIG. 3 where the download of the latest map data is omitted, according to an embodiment of the present disclosure.

FIG. 4 is a detailed flowchart illustrating the step or operation S32 of FIG. 3 where the download of the latest map data is omitted, according to an embodiment of the present disclosure.

Referring to FIG. 4, in a step or operation step S41, the navigation device may display information regarding whether to perform the download of the latest map data. In a step or operation S42, the download of the latest map data may be omitted based on user input. Steps or operations S41 and S42, according to some embodiments, are described in more detail below with reference to FIG. 5.

Figure 5:
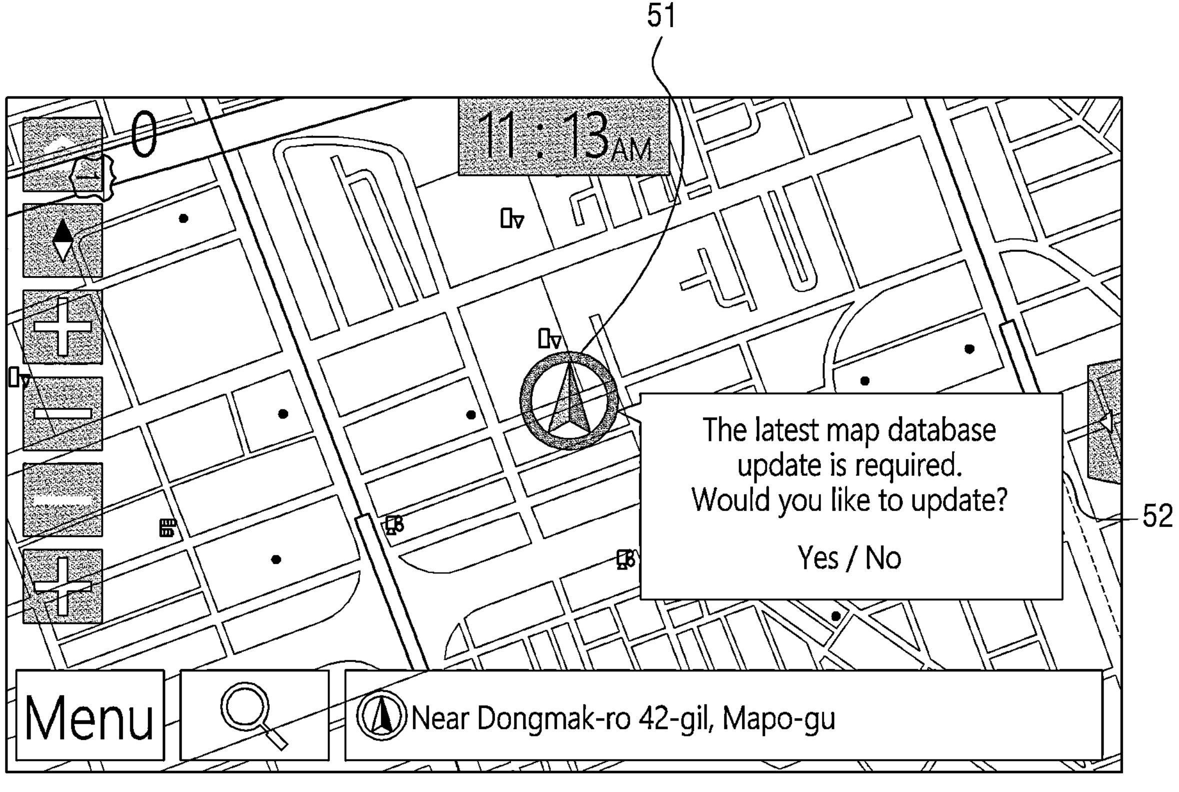
FIG. 5 is an exemplary diagram illustrating steps or operations S41 and S42 of FIG. 4 where the download of the latest map data is omitted, according to an embodiment of the present disclosure.

FIG. 5 is a diagram illustrating steps or operations S41 and S42 of FIG. 4 where the download of the latest map data is omitted, according to an embodiment of the present disclosure.

Referring to FIG. 5, vehicle position information 51, that indicates the current position of the vehicle, may be displayed on the screen of the navigation device. Then, information 52 regarding whether to perform the download of the latest map data may be displayed next to the vehicle position information 51.

The user may provide user input for the information 52 displayed on the screen of the navigation device. For example, the information 52 may present a user interface (UI) displaying a message that reads, "The latest map database update is required. Would you like to update?"

Additionally, a user interface (UI) for inputting an answer (e.g., "Yes" or "No") for the displayed message may be displayed as the information 52.

The user may provide user input for the information 52 based on the necessity of a latest map database (DB) update.

For example, if the user determines that a latest map DB update is necessary even for frequently traveled routes, the user may click or tap on "Yes" displayed on the screen of the navigation device as user input for the information 52.

On the other hand, if the user determines that a latest map DB update is not necessary for frequently traveled routes, the user may click or tap on "No" displayed on the screen of the navigation device as user input for the information 52.

Therefore, by giving the user the autonomy to decide whether to perform a latest map DB update for frequently traveled routes, the user's intention for whether to download the latest map data can be clearly reflected, thereby potentially reducing communication fees.

Figure 6:
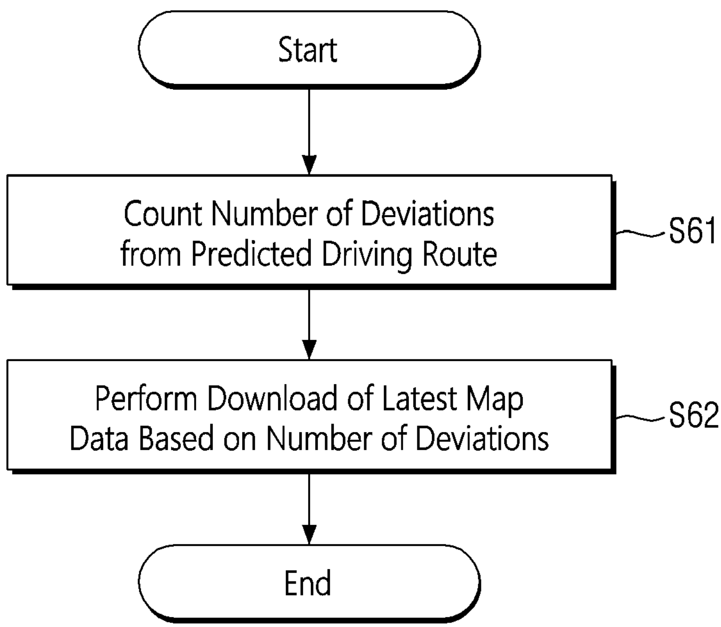
FIG. 6 is a flowchart illustrating a method for downloading latest map data by counting the number of deviations from a predicted driving route, according to an embodiment of the present disclosure.

FIG. 6 is a flowchart illustrating a method for downloading latest map data by counting the number of deviations from a predicted driving route, according to an embodiment of the present disclosure.

Referring to FIG. 6, in a step or operation S61, a navigation device may count the number of deviations from a predicted driving route. Using the navigation service, the user may deviate from the predicted driving route provided by the navigation device for a frequently traveled route.

Accordingly, if the user frequently deviates from the predicted driving route provided by the navigation device, such route may be considered a frequently traveled route.

Here, the predicted driving route may include all routes provided by the navigation device that are the same from their starting point to their same destination. Alternatively, the predicted driving route may also include routes that only share the same starting point and destination.

Therefore, the predicted driving route may include a plurality of driving routes considering a particular starting point and destination, but if the user frequently deviates at a particular point on the predicted driving route, the route from the particular point to the destination may be considered a frequently traveled route.

In a step or operation S61, the count for the number of deviations may be incremented by +1 for each deviation, but for deviation points on the predicted driving route that are very close to each other, the count for the number of deviations may be weighted.

For example, if the distance between the deviation points along the predicted driving route is less than 10 meters, the deviation points may be determined to be very close, and the count for the number of deviations may be incremented by +2, with a weight value applied.

In a step or operation S62, the navigation device may perform the download of latest map data for the predicted driving route based on the number of deviations. Here, the number of deviations refers to the counted number of deviations from the predicted driving route from step S61, and the target for the download of the latest map data may be the route from each deviation point to the destination. The method of FIG. 6, according to some embodiment, is described in more detail below with reference to FIG. 7.

Figure 7:
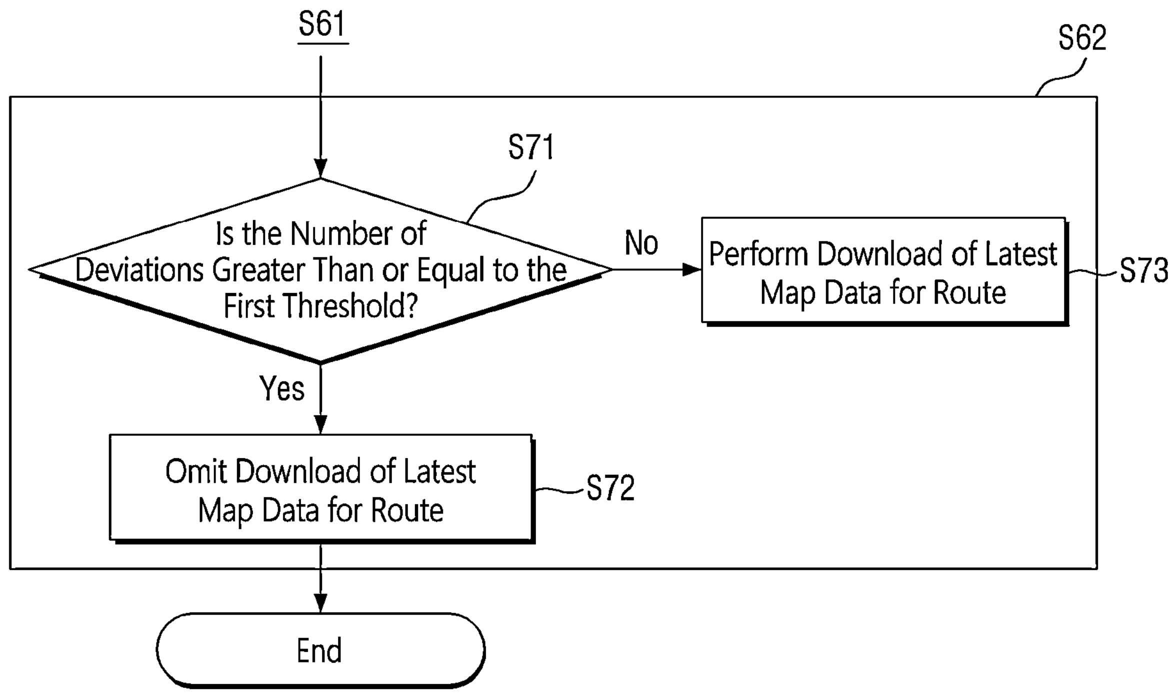
FIG. 7 is a detailed flowchart illustrating step or operation S62 of FIG. 6 where the download of the latest map data is performed based on the number of deviations, according to an embodiment of the present disclosure.

FIG. 7 is a detailed flowchart illustrating the step or operation S62 of FIG. 6 where the download of the latest map data is performed based on the number of deviations, according to an embodiment of the present disclosure.

Referring to FIG. 7, the navigation device may determine, in a step or operation S71, whether the number of deviations counted in the step or operation S61 of FIG. 6 exceeds a first threshold. Here, the first threshold may be set by the user and is not limited to a specific value, as long as it corresponds to the number of deviations used to determine a frequently traveled route.

When the number of deviations from the predicted driving route is determined to be less than the first threshold in the step or operation S71, the download of the latest map data may be performed in a step or operation S73.

This is because, if the number of deviations is determined to be less than the first threshold, the corresponding route may be considered as being not a frequently traveled route by the user, and the download of the latest map data for the route from the deviation point to the destination may be performed.

However, when the number of deviations is determined in the step or operation S71 to be equal to or greater than the first threshold, the route may be considered as a frequently traveled route by the user, and the download of the latest map data may be omitted in the step or operation S72.

This is because, if the download of the latest map data is performed even for routes frequently traveled by the user, excessive communication fees may be incurred, and issues such as process overload may arise.

Therefore, to address these issues, routes for which the download of the latest map data is unnecessary may be classified, and the download of the latest map data may be omitted for routes that pass the classification criteria.

Figure 8:
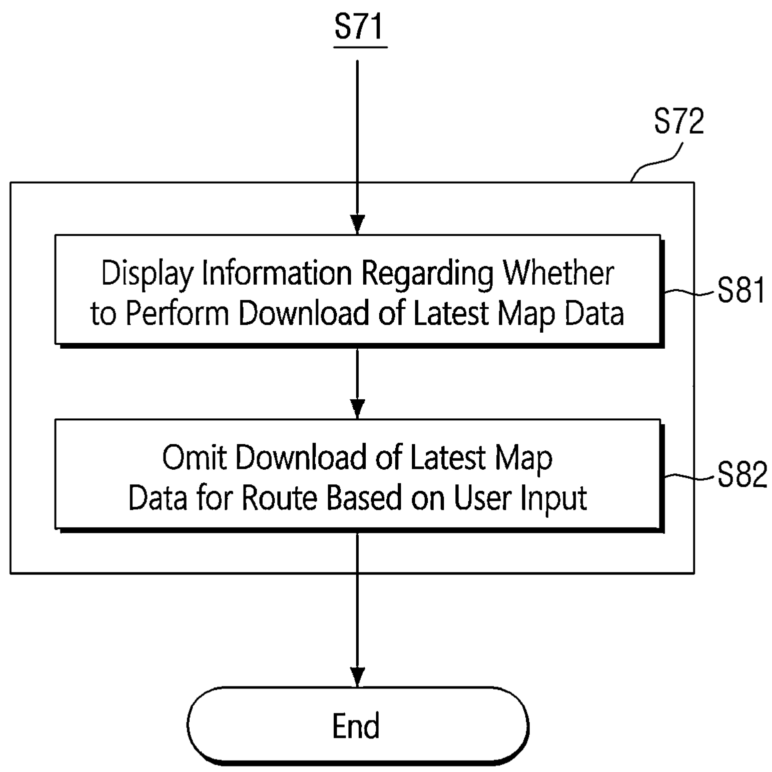
FIG. 8 is a detailed flowchart illustrating step or operation S72 of FIG. 7 where the download of the latest map data is omitted, according to an embodiment of the present disclosure.

FIG. 8 is a detailed flowchart illustrating the step or operation S72 of FIG. 7 where the download of the latest map data is omitted, according to an embodiment of the present disclosure.

Referring to FIG. 8, in a step or operation S81, the navigation device may display information regarding whether to perform the download of the latest map data. Thereafter, in a step or operation S82, based on user input, the download of the latest map data for the route from the deviation point to the destination may be omitted.

Steps or operations S81 and S82 are the same as their respective counterparts of FIGS. 4 and 5, and thus, detailed descriptions thereof has been omitted. However, the route for which the download of the latest map data is omitted in the steps or operations S81 and S82 may be the route from the deviation point to the destination along the predicted driving route.

Figure 9:
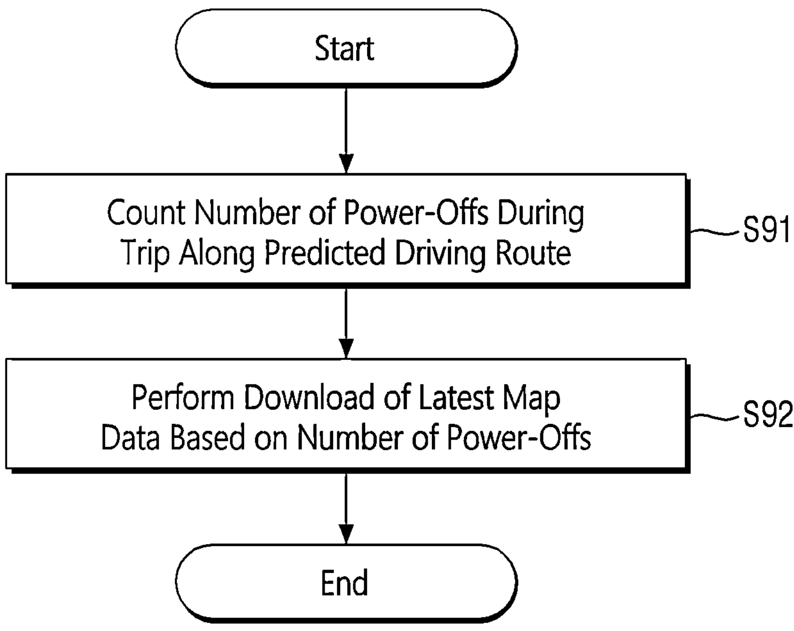
FIG. 9 is a flowchart illustrating a method for downloading latest map data based on the number of power-offs during a trip on each predicted driving route, according to an embodiment of the present disclosure.

FIG. 9 is a flowchart illustrating a method for downloading latest map data based on the number of power-offs during a trip on each predicted driving route, according to an embodiment of the present disclosure.

Referring to FIG. 9, in a step or operation S91, a navigation device may count the number of powers-offs during a trip on a predicted driving route. Using the navigation service, the user may drive to a destination with the navigation device powered off for a frequently traveled route.

Accordingly, when the user powers off the navigation device after receiving the predicted driving route from the navigation device, the predicted driving route provided by the navigation device may be considered frequently traveled by the user.

In this case, the predicted driving route may include all routes provided by the navigation device that have the same starting point and destination. Alternatively, the predicted driving route may also include routes that only share the same starting point and destination.

Therefore, the predicted driving route may include multiple driving routes considering the starting point and destination, but if the user frequently powers off the navigation device at a specific point on the predicted driving route, the route from that specific point to the destination may be considered a frequently traveled route.

In a step or operation S91, the count for the number of power-offs may be incremented by +1 for each power-off, but for power-off points that are very close to each other, the count for the number of power-offs may be weighted.

For example, if the distance between the power-off points along the predicted driving route is less than 10 meters, it may be determined that the power-off points are very close, and the count for the number of power-offs may be incremented by +2 or +3, with a weight value applied.

In a step or operation S92, the navigation device may perform the download of the latest map data for the predicted driving route based on the number of power-offs. Here, the number of power-offs refers to the counted number of power-offs from the step or operation S91, and the target for the download of the latest map data may be the route from each power-off point to the destination. The method of FIG. 9, according to some embodiments, is described in more detail below with reference to FIG. 10.

Figure 10:
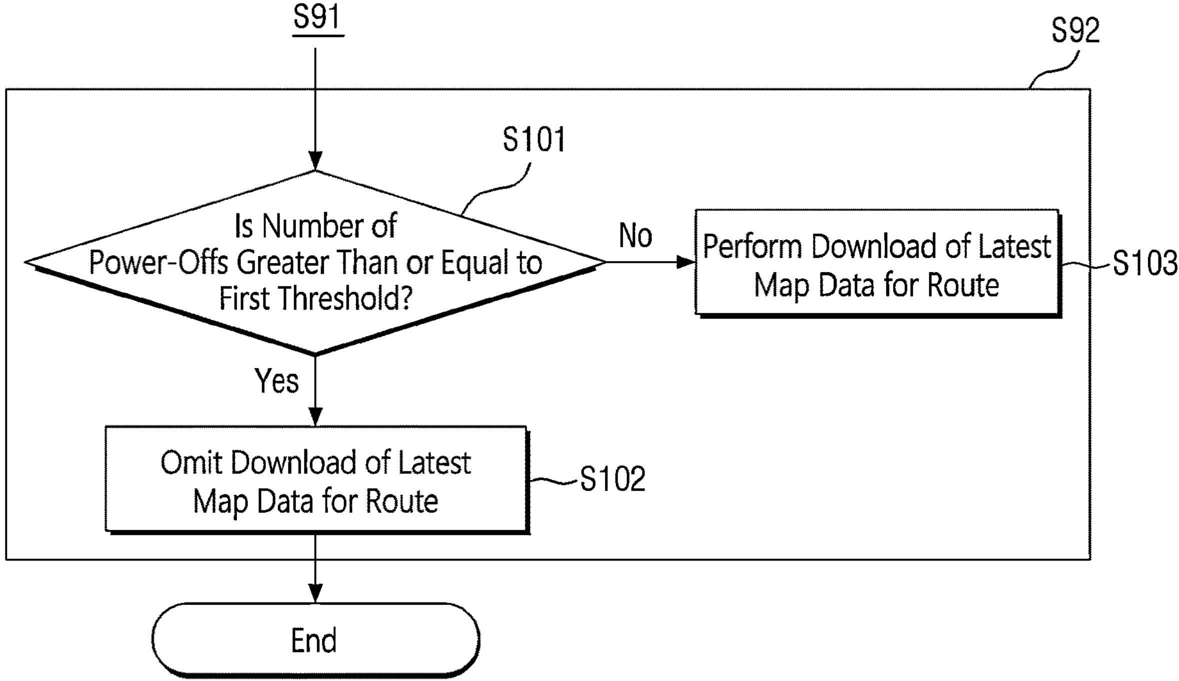
FIG. 10 is a detailed flowchart illustrating step or operation S92 or operation of FIG. 9 where the download of the latest map data is performed based on the number of power-offs, according to an embodiment of the present disclosure.

FIG. 10 is a detailed flowchart illustrating the step S92 or operation of FIG. 9 where the download of the latest map data is performed based on the number of power-offs, according to an embodiment of the present disclosure.

Referring to FIG. 10, the navigation device may determine, in a step or operation S101, whether the counted number of power-offs from the step or operation S91 of FIG. 9 exceeds a first threshold. Here, the first threshold may be set by the user and is not limited to a specific value.

When the number of times the device was powered off is determined to be less than the first threshold in the step or operation S101, the download of the latest map data for the route from the power-off point to the destination may be performed in a step or operation S103.

This is because, if the number of power-offs is determined to be less than the first threshold, the corresponding route may be considered as being not a frequently traveled route by the user, and the download of the latest map data for the route from the power-off point to the destination may be performed.

However, when the number of power-offs is determined in the step or operation S101 to be equal to or greater than the first threshold, the route may be considered as being a frequently traveled route by the user, and the download of the latest map data may be omitted in a step or operation S102.

This is because, if the download of the latest map data is performed even for routes frequently traveled by the user, excessive communication fees may be incurred, and issues such as process overload may arise.

Therefore, to address these issues, routes for which the download of the latest map data is unnecessary may be classified, and the download of the latest map data may be omitted for routes that pass the classification criteria.

Figure 11:
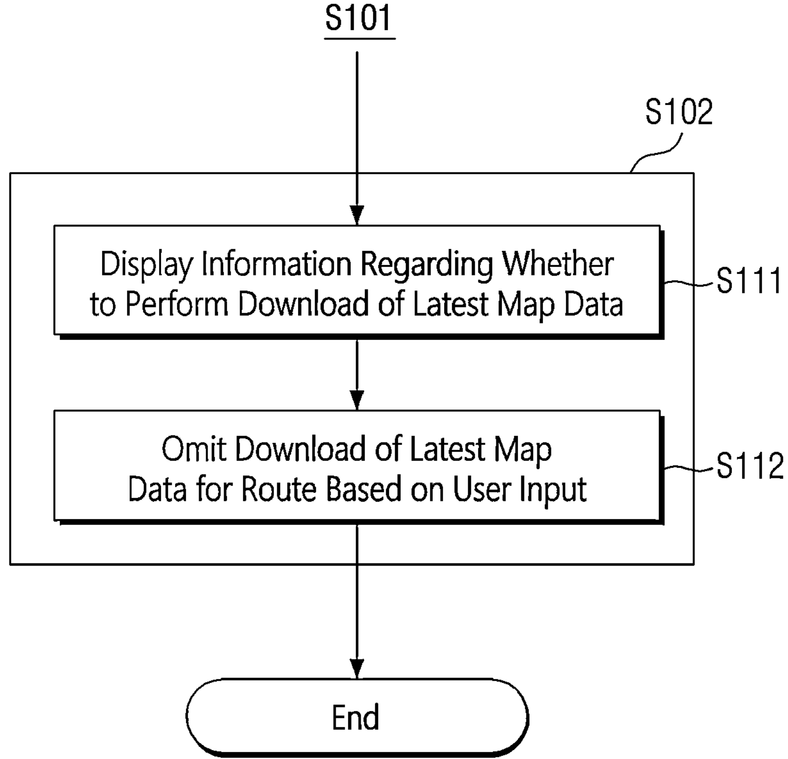
FIG. 11 is a detailed flowchart illustrating step or operation S102 of FIG. 10 where the download of the latest map data is omitted, according to an embodiment of the present disclosure.

FIG. 11 is a detailed flowchart illustrating the step or operation S102 of FIG. 10 where the download of the latest map data is omitted, according to an embodiment of the present disclosure.

Referring to FIG. 11, in a step or operation S111, the navigation device may display information regarding whether to perform the download of the latest map data. Thereafter, in a step or operation S112, based on user input, the download of the latest map data for the route from the power-off point to the destination may be omitted.

Steps or operations S111 and S112 are the same as their respective counterparts of FIGS. 4 and 5, and thus, detailed descriptions thereof has been omitted. However, the route for which the download of the latest map data is omitted in the steps or operations S111 and S112 may be the route from the power-off point to the destination along the predicted driving route.

The methods for downloading the latest map data according to some embodiments of the present disclosure have been described with reference to FIGS. 1-11. A hardware configuration of a latest map data download system according to some embodiments of the present disclosure is described below with reference to FIG. 12.

Figure 12:
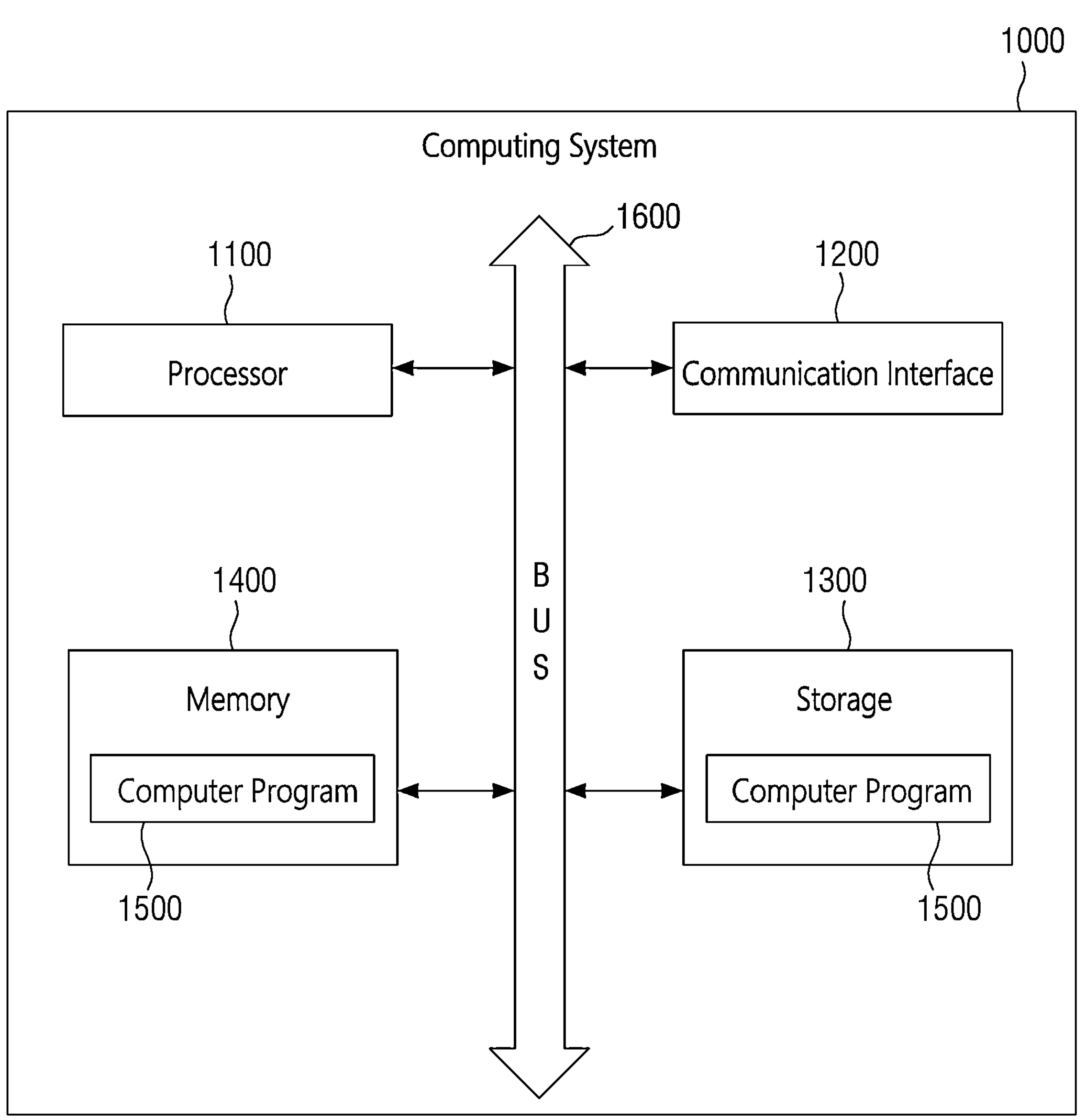
FIG. 12 is a hardware configuration diagram of a computing system according to some embodiments of the present disclosure.

FIG. 12 is a hardware configuration diagram of a computing system 1000 according to some embodiments of the present disclosure. The computing system 1000 corresponds to the service server 10 of FIG. 1, in an embodiment.

Referring to FIG. 12, the computing system 1000 may include at least one processor 1100, a bus 1600, a communication interface 1200, a memory 1400 that loads a computer program 1500 executed by the processor 1100, and a storage 1300 that stores the computer program 1500.

However, FIG. 12 illustrates only the relevant components to the embodiments of the present disclosure. Therefore, a person having ordinary skill in the art should understand that other general-purpose components, in addition to those illustrated in FIG. 12, may also be included.

Accordingly, the computing system 1000 may include various components other than those illustrated in FIG. 12. Additionally, in some embodiments, the computing system 1000 may be configured without some of the components illustrated in FIG. 12. The components of the computing system 1000 are described in more detail below.

The processor 1100 may control the overall operation of the computing system 1000. The processor 1100 may include at least one of a central processing unit (CPU), a micro-processing unit (MPU), a micro-controller unit (MCU), a graphics processing unit (GPU), a neural processing unit (NPU), or any other well-known processor in the technical field of the present disclosure.

Additionally, the processor 1100 may perform computations for at least one application or program that executes the operations/methods according to the embodiments of the present disclosure. The computing system 1000 may include one or more processors.

The memory 1400 may store various data, commands, and/or information. The memory 1400 may load the computer program 1500 from the storage 1300 to execute operations/methods according to various embodiments of the present disclosure. The memory 1400 may be implemented as a volatile memory, such as a random-access memory (RAM), but the scope of the present disclosure is not limited thereto.

The bus 1600 may provide communication functionality between the components of the computing system 1000. The bus 1600 may be implemented as various types of buses, such as an address bus, data bus, or control bus.

The communication interface 1200 may support wired or wireless Internet communication for the computing system 1000. Additionally, the communication interface 1200 may support various communication methods other than Internet communication. To achieve this, the communication interface 1200 may include a well-known communication module in the technical field of the present disclosure.

The storage 1300 may non-transiently store one or more computer programs 1500. The storage 1300 may include a non-volatile memory, such as a read-only memory (ROM), an erasable programmable ROM (EPROM), an electrically erasable programmable ROM (EEPROM), a flash memory, a hard disk, a removable disk, or any well-known form of computer-readable recording medium in the technical field of the present disclosure.

The computer program 1500 may include one or more instructions that cause the processor 1100 to perform the operations/methods according to the various embodiments of the present disclosure when loaded into the memory 1400. Accordingly, by executing the one or more instructions, the processor 1100 may perform the operations/methods according to the various embodiments of the present disclosure.

For example, the computer program 1500 may execute instructions for classifying a route traveled without route setting based on its starting point and destination, instructions for counting the number of trips for the classified route, and instructions for downloading the latest map data for the classified route based on the counted number of trips.

The hardware configuration of the computing system 1000 according to some embodiments of the present disclosure has been described above with reference to FIG. 12.

A variety of embodiments of the present disclosure and the effects according to embodiments thereof have been described above with reference to FIGS. 1-12. The effects according to the technical idea of the present disclosure are not limited to the forementioned effects, and other unmentioned effects not mentioned herein may be clearly understood by those having ordinary skill in the art from the description of the present disclosure.

The technical features of the present disclosure described above may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should be understood that desired results may obtained not only when the operations are performed in the specific order or sequential order or when all of the operations are performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

It is noted that those having ordinary skill in the art should appreciate that many variations and modifications may be made to the described embodiments without departing from the scope of the present disclosure. Therefore, the described embodiments of the present disclosure are illustrative and not provided for purposes of limitation.

What is claimed is:

1. A method for downloading latest map data, the method comprising:

classifying, by a navigation device, a route traveled without route setting based on a starting point and a destination of the route;

counting, by the navigation device, a number of trips for the route; and performing, by the navigation device, a download of the latest map data for the route based on the number of trips.

2. The method of claim 1, wherein:

classifying the route traveled without route setting includes classifying the route traveled without route setting based on similarities of starting points and destinations; and there are multiple routes traveled without route setting.

3. The method of claim 1, wherein performing the download of the latest map data for the route includes:

omitting the download of the latest map data for the route when the number of trips is greater than or equal to a first threshold; and performing the download of the latest map data for the route when the number of trips is less than the first threshold.

4. The method of claim 3, wherein omitting the download of the latest map data for the route includes:

displaying information regarding whether to perform the download of the latest map data for the route; and omitting the download of the latest map data for the route based on user input for the displayed information regarding whether to perform the download.

* * * * *